(12) United States Patent
Pei et al.

(10) Patent No.: US 12,417,778 B2
(45) Date of Patent: Sep. 16, 2025

(54) METHOD FOR DYNAMICALLY ADJUSTING VIBRATION FEEDBACK WITH AUDIO, SYSTEM, AND DEVICE

(71) Applicant: AAC Acoustic Technologies (Shanghai) Co., Ltd., Shanghai (CN)

(72) Inventors: Shiyu Pei, Shanghai (CN); Zengyou Meng, Shanghai (CN); Mengya Cao, Shanghai (CN); Yajun Zheng, Shanghai (CN)

(73) Assignee: AAC Acoustic Technologies (Shanghai) Co., Ltd., Shanghai (CN)

( * ) Notice: Subject to any disclaimer, the term of this patent is extended or adjusted under 35 U.S.C. 154(b) by 283 days.

(21) Appl. No.: 18/334,337

(22) Filed: Jun. 13, 2023

(65) Prior Publication Data

US 2024/0221771 A1    Jul. 4, 2024

Related U.S. Application Data

(63) Continuation of application No. PCT/CN2023/072710, filed on Jan. 17, 2023.

(30) Foreign Application Priority Data

Dec. 29, 2022  (CN) .......................... 202211726957.5

(51) Int. Cl.
*G10L 21/00* (2013.01)
*G10L 21/0332* (2013.01)

(52) U.S. Cl.
CPC .............................. *G10L 21/0332* (2013.01)

(58) Field of Classification Search
CPC .. G10L 21/0332; G10L 21/16; G10L 25/0021
See application file for complete search history.

(56) References Cited

U.S. PATENT DOCUMENTS

| | | | |
|---|---|---|---|
| 11,450,305 B2* | 9/2022 | Bernal Castillo | H04R 1/028 |
| 11,951,389 B2* | 4/2024 | Lindemann | G06F 3/165 |
| 2017/0325039 A1* | 11/2017 | Khwaja | H04R 29/001 |

* cited by examiner

*Primary Examiner* — Rasha S Al Aubaidi
(74) *Attorney, Agent, or Firm* — Wiersch Law Group

(57) ABSTRACT

The method for dynamically adjusting vibration feedback with audio includes: acquiring original audio data; defining preset signal vibration thresholds, tracking instantaneous audio power envelopes of the original audio data to obtain corresponding instantaneous power features, and adaptively adjusting the preset signal vibration thresholds according to the instantaneous power features to obtain signal vibration thresholds; determining the vibration intervals for the original audio data according to the instantaneous power features and the signal vibration thresholds, and dynamically adjusting vibration signal amplitude envelopes of the original audio data to generate vibration driving signals; and outputting vibration feedback based on the vibration driving signals.

7 Claims, 6 Drawing Sheets

METHOD FOR DYNAMICALLY ADJUSTING VIBRATION FEEDBACK WITH AUDIO, SYSTEM, AND DEVICE

TECHNICAL FIELD

The present disclosure relates to the field of audio technology, and in particular to a method for dynamically adjusting vibration feedback with audio, a system, and a device.

BACKGROUND

Music vibration feedback has gradually been applied to call ringtones, music playback software, video music playback and the like, giving music a richer and more interesting tactile experience on the basis of traditional sound playback.

In related technologies, music vibration feedback is mostly implemented based on neural networks. The models take up large storage space and take a long time to transform. Subsequent applications need to call vibration files from the library for transformed files to implement music vibration feedback, which is difficult to meet the requirements of real-time scenes in the market.

Therefore, it is necessary to provide a real-time audio vibration feedback method, to meet the requirements of real-time and accurate vibration feedback.

SUMMARY

The objective technical problem of the present disclosure is to provide a method for generating vibration output that matches music in real-time.

To this end, some embodiments of the present disclosure provide a method for dynamically adjusting vibration feedback with audio, the method includes:
  acquiring original audio data;
  defining preset signal vibration thresholds, tracking instantaneous audio power envelopes of the original audio data to obtain corresponding instantaneous power features, and adaptively adjusting the preset signal vibration thresholds according to the instantaneous power features to obtain signal vibration thresholds;
  determining the vibration intervals for the original audio data according to the instantaneous power features and the signal vibration thresholds, and dynamically adjusting vibration signal amplitude envelopes of the original audio data to generate vibration driving signals; and
  outputting vibration feedback based on the vibration driving signals.

In some embodiments, defining the preset signal vibration thresholds, tracking the instantaneous audio power envelopes of the original audio data to obtain the corresponding instantaneous power features, and adaptively adjusting the preset signal vibration thresholds according to the instantaneous power features to obtain the signal vibration thresholds, includes:
  in an i-th frame, a preset signal vibration threshold is $T_i(1)$, at a t-th moment in the original audio data, a signal vibration threshold is $T_i(t)$, and an instantaneous power feature obtained by tracking the instantaneous audio power envelopes is $C_i(t)$;
  setting a ratio r and adjusting the instantaneous power feature $C_i(t)$ according to the ratio to obtain a second instantaneous power feature $C_i'(t)$, wherein $C_i'(t) = r*C_i(t)$;
  comparing an amplitude of the second instantaneous power feature $C_i'(t)$ with a signal vibration threshold $T_i(t-1)$ at a $(t-1)$-th moment, and adaptively adjusting the $T_i(t)$;
  in response to the amplitude of $C_i'(t)$ being greater than the $T_i(t-1)$, increasing the signal vibration threshold $T_i(t)$; and
  in response to the amplitude of $C_i'(t)$ being less than the $T_i(t-1)$, decreasing the signal vibration threshold $T_i(t)$.

In some embodiments, the ratio r ranges from 0 to 1.

In some embodiments, determining the vibration intervals for the original audio data according to the instantaneous power features and the signal vibration thresholds, and dynamically adjusting the vibration signal amplitude envelopes of the original audio data to generate the vibration driving signals, includes:
  comparing the $C_i'(t)$ and the $T_i(t)$ in the original audio data, and in response to the $C_i'(t)$ being greater than the $T_i(t)$, determining a time interval corresponding to the t-th moment as a vibration interval; and
  providing a vibrator having a resonance frequency f and a rated voltage vrms, filling a single-frequency and short-length signal of the resonance frequency f and the rated voltage vrms into the vibration interval according to a length of the vibration interval and a power level within the vibration interval, and adjusting a vibration signal amplitude envelope according to an instantaneous audio power envelope to generate a vibration driving signal within the vibration interval.

In some embodiments, outputting the vibration feedback based on the vibration driving signals, includes:
  filling short-length signals having the vibration signal amplitude envelopes frame-by-frame into time intervals of the original audio data to obtain the vibration driving signals corresponding to the original audio data, and reserving a last instantaneous power feature and a last threshold of each frame as initial values for a next frame; and
  outputting the vibration driving signals to the vibrator to generate the vibration feedback.

In some embodiments, acquiring the original audio data, includes: dividing the original audio data at a preset temporal interval, where each preset temporal interval corresponds to one frame of the original audio data.

In some embodiments, acquiring the original audio data, further includes: determining whether a first frame of the original audio data is single-channel data;
  in response to the first frame of the original audio data being single-channel data, directly acquiring each subsequent frame of data; and
  in response to the first frame of the original audio data being not single-channel data, acquiring average values of data from different channels in each subsequent frame of the original audio data.

Some embodiments of the present disclosure provide a system for dynamically adjusting vibration feedback with audio, including:
  an audio acquisition module, configured to acquire original audio data;
  a threshold adjustment module, configured to define preset signal vibration thresholds, track instantaneous audio power envelopes of the original audio data to obtain corresponding instantaneous power features, and adaptively adjust the preset signal vibration thresholds according to the instantaneous power features to obtain signal vibration thresholds;

an amplitude adjustment module, configured to determine the vibration intervals for the original audio data according to the instantaneous power features and the signal vibration thresholds, and adjust vibration signal amplitude envelopes of the original audio data to generate vibration driving signals; and a vibration feedback module, configured to output vibration feedback based on the vibration driving signals.

Some embodiments of the present disclosure provide a computer device, including: a memory; a processor; and computer programs stored in the memory and executable to the processor. The computer programs, when executed by the processor, cause the processor to implement operations of the method as illustrated above.

Some embodiments of the present disclosure provide a non-transitory computer readable storage medium, configured to store computer programs, which, when executed by a processor, causes the process to implement operations of the method as illustrated above.

Compared with the related technologies, in the method for dynamically adjusting vibration feedback with audio provided by the present disclosure, power envelope features of an audio is obtained by reading the audio frame-by-frame and analyzing data, adaptive adjustment is performed on vibration thresholds based on the obtained features, the vibration driving signals are determined for corresponding vibration intervals by judging the relationship between the features and the thresholds, and the amplitudes of the vibration driving signals are dynamically adjusted according to the audio, thereby implementing real-time audio vibration feedback. In this way, the matching vibration feedback can be obtained in real-time according to the audio data, and user experience on vibration feedback can be improved.

BRIEF DESCRIPTION OF DRAWINGS

In order to provide a clearer illustration of the technical solution in the embodiments of the present disclosure, a brief description will be given to the accompanying drawings used in the description of the embodiments. It is evident that the described accompanying drawings are only some embodiments of the present disclosure. For those skilled in the art, other drawings can be obtained based on these drawings without any creative effort.

DETAILED DESCRIPTION OF EMBODIMENTS

The following will provide, in conjunction with the accompanying drawings in the embodiments of the present disclosure, a clear and complete description of the technical solution in the embodiments of the present disclosure. Obviously, the illustrated embodiments are only a part of the embodiments of the present disclosure, not all of them.

Based on the embodiments of the present disclosure, all other embodiments obtained by those skilled in the art without creative work fall within the scope of protection of the present disclosure.

Figure 1:
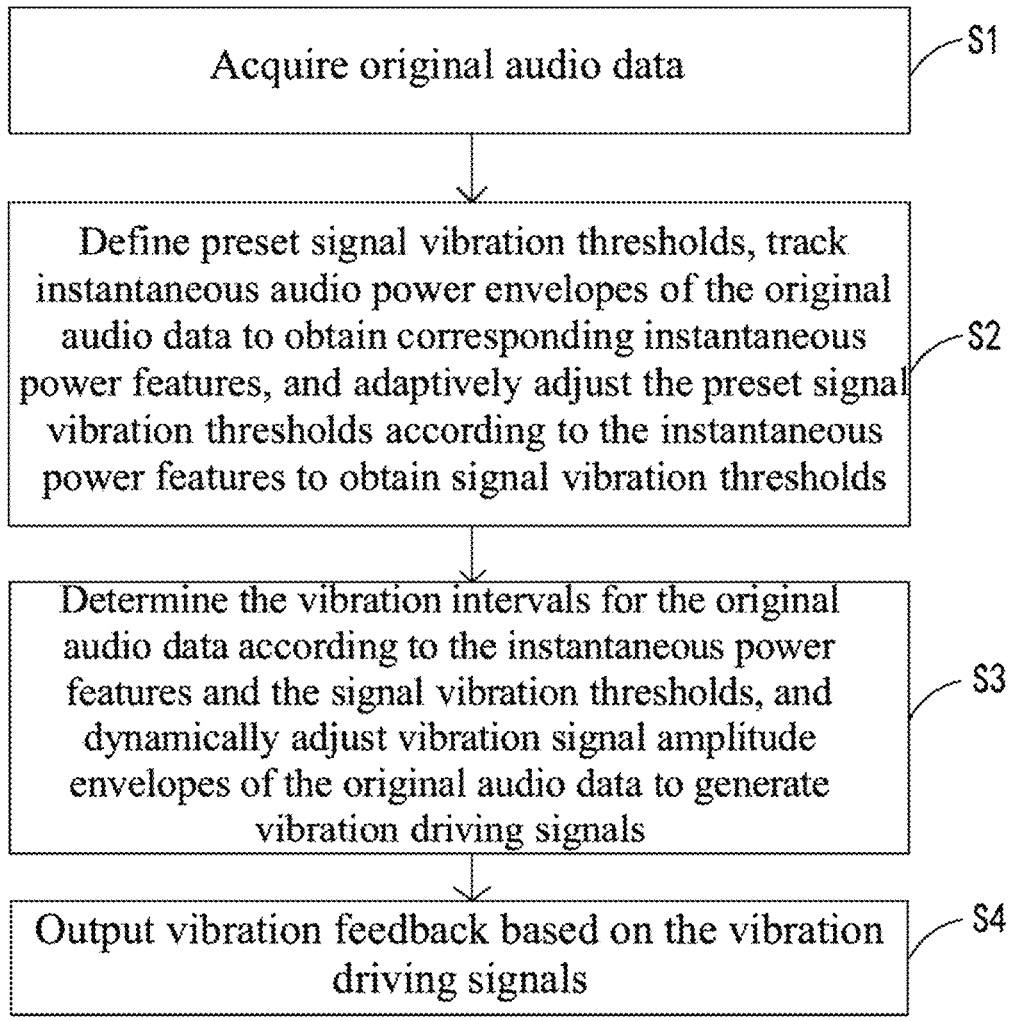
FIG. 1 is a flowchart of operations of the method for dynamically adjusting vibration feedback with audio according to some embodiments of the present disclosure.

Referring to FIG. 1, FIG. 1 is a flowchart of operations of the method for dynamically adjusting vibration feedback with audio according to some embodiments of the present disclosure. The method includes the following operations.

At S1, original audio data is acquired.

The methods used for acquiring the original audio data in the embodiments of the present disclosure include but are not limited to: acquiring from existing audio data, or converting the audio data into a separate audio data file after real-time acquisition of the audio data through recording machines, video shooting, and other methods.

In some embodiments, acquisition of the original audio data includes dividing the original audio data at a preset temporal interval, where each preset temporal interval corresponds to one frame of the original audio data. For example, the original audio data is divided at an interval of 200 ms, thereby dividing the original audio data into frames, and a duration of each frame is 200 ms.

In some embodiments, acquisition of the original audio data further includes: determining whether a first frame of the original audio data is single-channel data;

in response to the first frame of the original audio data being single-channel data, directly acquiring each subsequent frame of data; and in response to the first frame of the original audio data being not single-channel data, acquiring average values of data from different channels in each subsequent frame of the original audio data.

At S2, preset signal vibration thresholds are defined, instantaneous audio power envelopes of the original audio data are tracked to obtain corresponding instantaneous power features, and the preset signal vibration thresholds are adaptively adjusted according to the instantaneous power features to obtain signal vibration thresholds.

In some embodiments, defining the preset signal vibration thresholds, tracking the instantaneous audio power envelopes of the original audio data to obtain the corresponding instantaneous power features, and adaptively adjusting the preset signal vibration thresholds according to the instantaneous power features to obtain the signal vibration thresholds, includes the following operations.

At S21, in an i-th frame, a preset signal vibration threshold is $T_i(1)$, at a t-th moment in the original audio data, a signal vibration threshold is $T_i(t)$, and an instantaneous power feature obtained by tracking the instantaneous audio power envelopes is $C_i(t)$.

Figure 2:
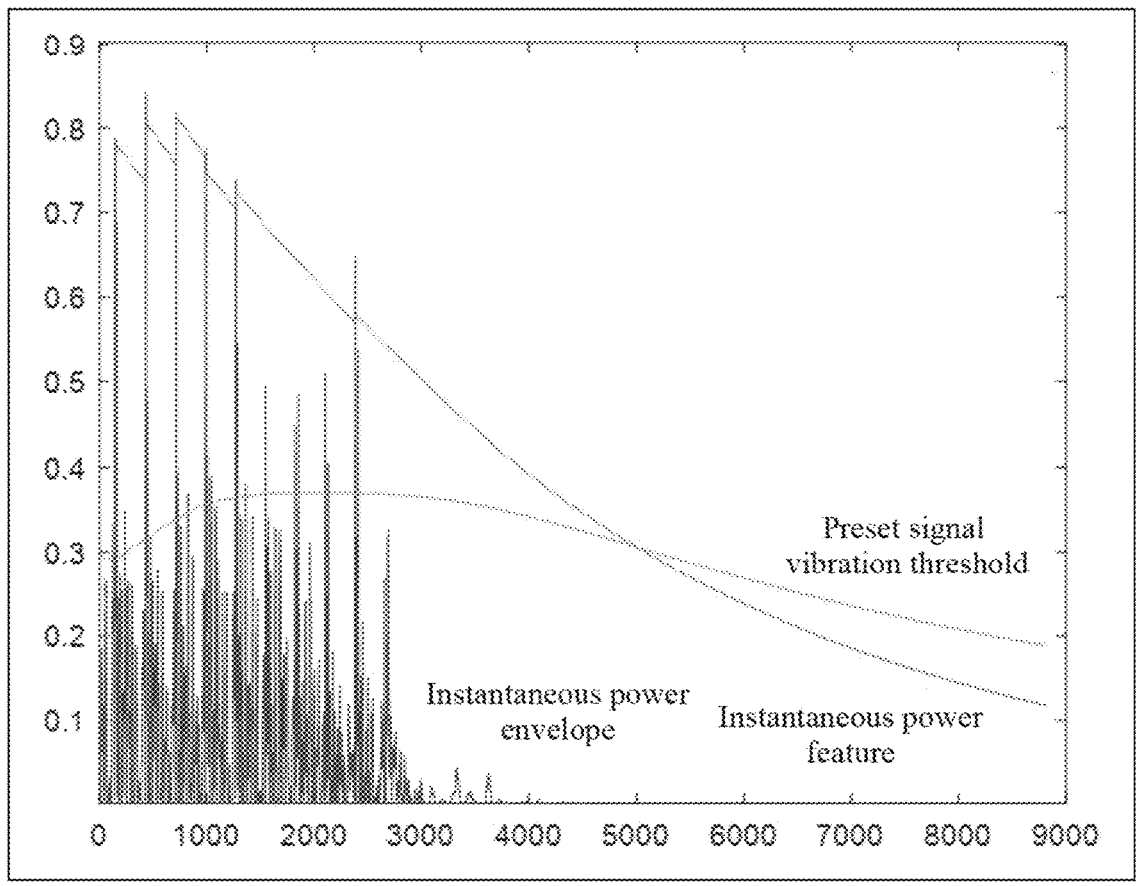
FIG. 2 is a diagram of relationships among the instantaneous power envelopes, the instantaneous power features, and the preset signal vibration thresholds in the embodiments of the present disclosure.

Referring to FIG. 2, FIG. 2 is a diagram of relationships among the instantaneous power envelopes, the instantaneous power features, and the preset signal vibration thresholds in the embodiments of the present disclosure. The instantaneous power feature $C_i(t)$ includes at least the following power information: the data in the i-th frame of the original audio data and representing energy for instantaneous power which constitutes the continuous and irregular amplitude shape in the lower left part of FIG. 2. The instantaneous power feature $C_i(t)$ obtained by tracking the instantaneous audio power envelopes has continuity and may be represented by a continuous curve.

At S22, a ratio r is set and the instantaneous power feature $C_i(t)$ is adjusted according to the ratio to obtain a second instantaneous power feature $C_i'(t)$, where $C_i'(t)=r*C_i(t)$.

At S23, an amplitude of the second instantaneous power feature $C_i'(t)$ is compared with a signal vibration threshold $T_i(t-1)$ at a (t-1)-th moment, and the $T_i(t)$ is adaptively adjusted;

in response to the amplitude of $C_i'(t)$ being greater than the $T_i(t-1)$, the signal vibration threshold $T_i(t)$ is increased; and in response to the amplitude of $C_i'(t)$ being less than the $T_i(t-1)$, the signal vibration threshold $T_i(t)$ is decreased.

In the embodiments of the present disclosure, the signal vibration thresholds are determined to make the vibration driving signals more matched with the power of the original audio data. Therefore, the preset amplitudes may be adjusted according to the amplitudes of the instantaneous power features.

In some embodiments, the ratio r ranges from 0 to 1.

At S3, the vibration intervals for the original audio data are determined according to the instantaneous power features and the signal vibration thresholds, and vibration signal amplitude envelopes of the original audio data are dynamically adjusted to generate vibration driving signals.

In some embodiments, determining the vibration intervals for the original audio data according to the instantaneous power features and the signal vibration thresholds, and dynamically adjusting the vibration signal amplitude envelopes of the original audio data to generate the vibration driving signals, includes the following operations.

At S31, the $C_i'(t)$ and the $T_i(t)$ in the original audio data are compared, and in response to the $C_i'(t)$ being greater than the $T_i(t)$, a time interval corresponding to the t-th moment is determined as a vibration interval.

At S32, a vibrator having a resonance frequency f and a rated voltage vrms is provided, a single-frequency and short-length signal of the resonance frequency f and the rated voltage vrms is filled into the vibration interval according to a length of the vibration interval and a power level within the vibration interval, and a vibration signal amplitude envelope is adjusted according to an instantaneous audio power envelope to generate a vibration driving signal within the vibration interval.

Figure 3:
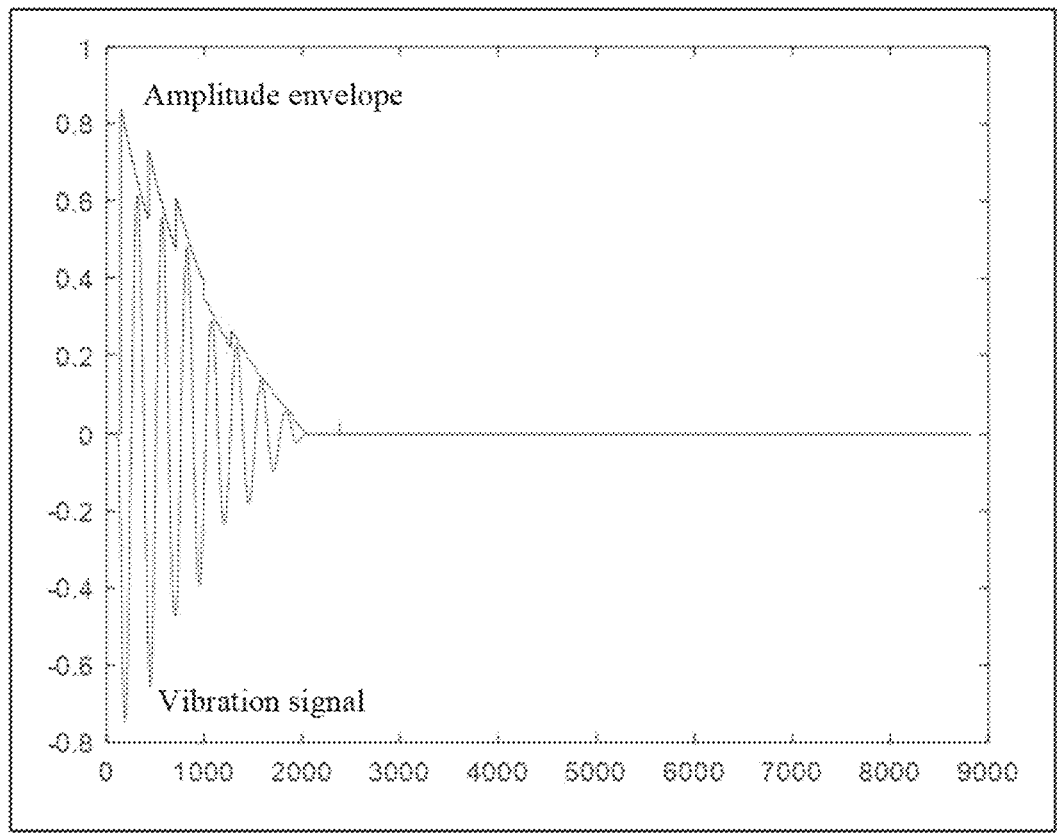
FIG. 3 is a diagram of the amplitudes of a vibration driving signal in the embodiments of the present disclosure.

Referring to FIG. 3, FIG. 3 is a diagram of the amplitudes of a vibration driving signal in the embodiments of the present disclosure. Compared with the amplitude of an original vibrator, after adjusting the amplitudes through the single-frequency signal of the resonance frequency f, the obtained vibration driving signals have greater amplitudes, and changes in the amplitudes are reduced, making the vibration feedback more continuous.

At S4, vibration feedback is output based on the vibration driving signals.

In some embodiments, outputting the vibration feedback based on the vibration driving signals, includes the following operations.

At S41, short-length signals having the vibration signal amplitude envelopes are filled frame-by-frame into time intervals of the original audio data to obtain the vibration driving signals corresponding to the original audio data, and a last instantaneous power feature and a last threshold of each frame are reserved as initial values for a next frame.

At S42, the vibration driving signals are output to the vibrator to generate the vibration feedback.

The tactile feedback effect is implemented through a vibration feedback system mainly composed of the vibrator.

Figure 4:
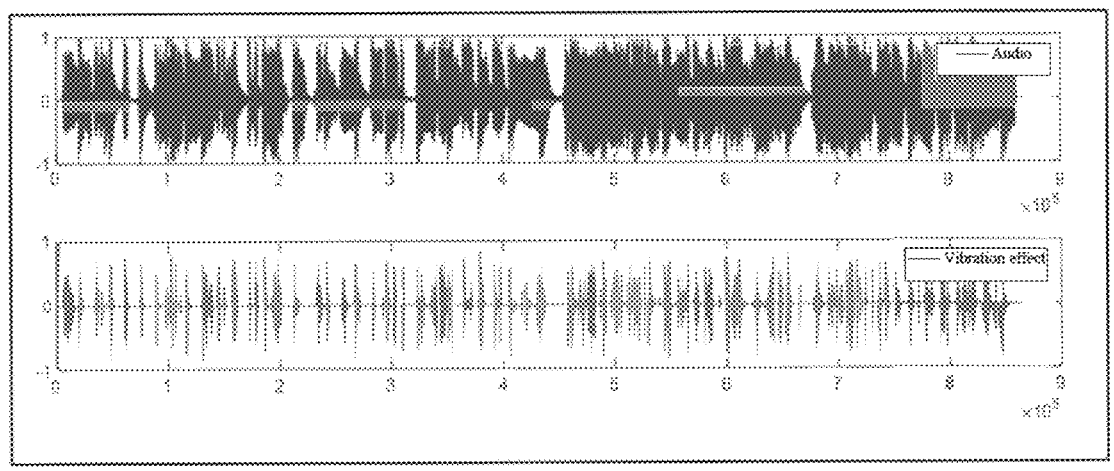
FIG. 4 is a diagram of the vibration driving signal obtained according to the original audio data in the embodiments of the present disclosure.

Referring to FIG. 4, FIG. 4 is a diagram of the vibration driving signal obtained according to the original audio data in the embodiments of the present disclosure. It is evident that the vibration driving signals obtained by the method for dynamically adjusting vibration feedback with audio according to the embodiments of the present disclosure can accurately correspond to the original audio data.

Compared with the related technologies, in the method for dynamically adjusting vibration feedback with audio provided by the present disclosure, power envelope features of an audio is obtained by reading the audio frame-by-frame and analyzing data, adaptive adjustment is performed on vibration thresholds based on the obtained features, the vibration driving signals are determined for corresponding vibration intervals by judging the relationship between the features and the thresholds, and the amplitudes of the vibration driving signals are dynamically adjusted according to the audio, thereby implementing real-time audio vibration feedback. In this way, the matching vibration feedback can be obtained in real-time according to the audio data, and user experience on vibration feedback can be improved.

Figure 5:
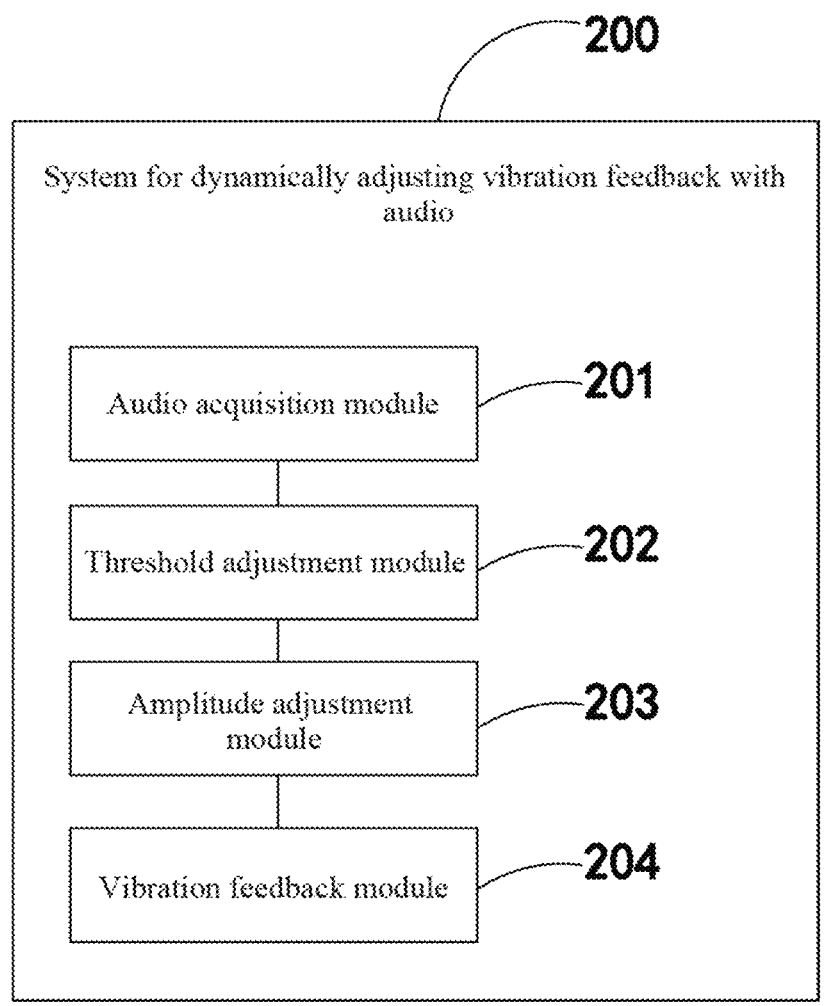
FIG. 5 is a structural diagram of the system 200 for dynamically adjusting vibration feedback with audio according to some embodiments of the present disclosure.

Some embodiments of the present disclosure provide a system for dynamically adjusting vibration feedback with audio. Referring to FIG. 5, FIG. 5 is a structural diagram of the system 200 for dynamically adjusting vibration feedback with audio according to some embodiments of the present disclosure. The system includes:

an audio acquisition module 201, configured to acquire original audio data;

a threshold adjustment module 202, configured to define preset signal vibration thresholds, track instantaneous audio power envelopes of the original audio data to obtain corresponding instantaneous power features, and adaptively adjust the preset signal vibration thresholds according to the instantaneous power features to obtain signal vibration thresholds;

an amplitude adjustment module 203, configured to determine the vibration intervals for the original audio data according to the instantaneous power features and the signal vibration thresholds, and dynamically adjust vibration signal amplitude envelopes of the original audio data to generate vibration driving signals; and a vibration feedback module 204, configured to output vibration feedback based on the vibration driving signals.

The system 200 for dynamically adjusting vibration feedback with audio provided by the embodiments of the present disclosure can implement the operations of the method for dynamically adjusting vibration feedback with audio as illustrated above, and can achieve the same technical effect. Reference is made to the illustration in the above embodiments and will not be repeated here.

Figure 6:
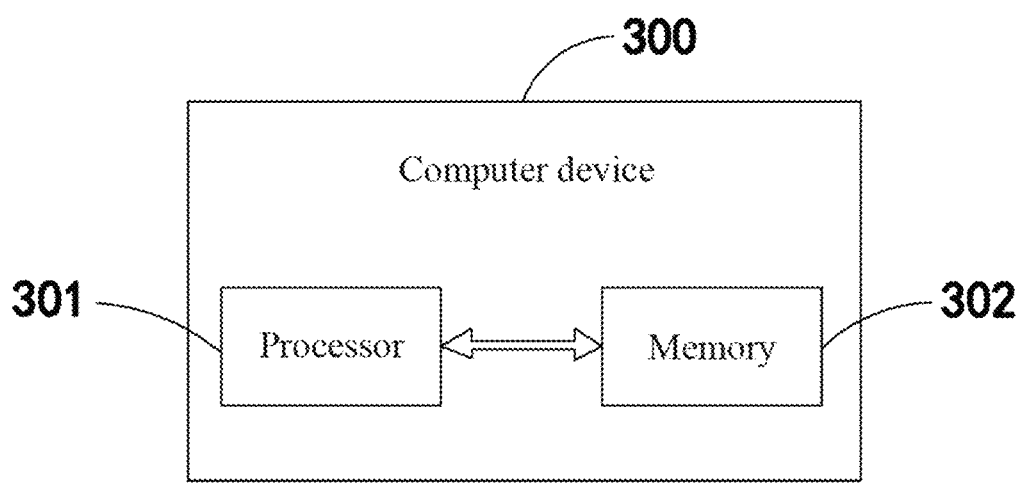
FIG. 6 is a structural diagram of the computer device according to some embodiments of the present disclosure.

Some embodiments of the present disclosure provide a computer device. Referring to FIG. 6, FIG. 6 is a structural diagram of the computer device according to some embodiments of the present disclosure. The computer device 300 includes: a processor 301; a memory 302; and computer programs stored in the memory 302 and executable to the processor 301.

Reference is made in conjunction with FIG. 1, the processor 301 calls the computer programs stored in the memory 302. When the computer programs are executed, operations of the method for dynamically adjusting vibration feedback with audio as illustrated above are implemented, including:

acquiring original audio data;

defining preset signal vibration thresholds, tracking instantaneous audio power envelopes of the original audio data to obtain corresponding instantaneous power features, and adaptively adjusting the preset signal vibration thresholds according to the instantaneous power features to obtain signal vibration thresholds;

determining the vibration intervals for the original audio data according to the instantaneous power features and the signal vibration thresholds, and dynamically adjusting vibration signal amplitude envelopes of the original audio data to generate vibration driving signals; and outputting vibration feedback based on the vibration driving signals.

In some embodiments, defining the preset signal vibration thresholds, tracking the instantaneous audio power envelopes of the original audio data to obtain the corresponding instantaneous power features, and adaptively adjusting the preset signal vibration thresholds according to the instantaneous power features to obtain the signal vibration thresholds, includes:

in an i-th frame, a preset signal vibration threshold is $T_i$ (1), at a t-th moment in the original audio data, a signal vibration threshold is $T_i$ (t), and an instantaneous power feature obtained by tracking the instantaneous audio power envelopes is $C_i$ (t);

setting a ratio r and adjusting the instantaneous power feature $C_i$ (t) according to the ratio to obtain a second instantaneous power feature $C_i'$ (t), wherein $C_i'$ (t)=r*$C_i$ (t);

comparing an amplitude of the second instantaneous power feature $C_i'$ (t) with a signal vibration threshold $T_i$ (t−1) at a (t−1)-th moment, and adaptively adjusting the $T_i$ (t);

in response to the amplitude of $C_i'$ (t) being greater than the $T_i$ (t−1), increasing the signal vibration threshold $T_i$ (t); and in response to the amplitude of $C_i'$ (t) being less than the $T_i$ (t−1), decreasing the signal vibration threshold $T_i$ (t).

In some embodiments, the ratio r ranges from 0 to 1.

In some embodiments, determining the vibration intervals for the original audio data according to the instantaneous power features and the signal vibration thresholds, and dynamically adjusting the vibration signal amplitude envelopes of the original audio data to generate the vibration driving signals, includes:

comparing the $C_i'$ (t) and the $T_i$ (t) in the original audio data, and in response to the $C_i'$ (t) being greater than the $T_i$ (t), determining a time interval corresponding to the t-th moment as a vibration interval; and providing a vibrator having a resonance frequency f and a rated voltage vrms, filling a single-frequency and short-length signal of the resonance frequency f and the rated voltage vrms into the vibration interval according to a length of the vibration interval and a power level within the vibration interval, and adjusting a vibration signal amplitude envelope according to an instantaneous audio power envelope to generate a vibration driving signal within the vibration interval.

In some embodiments, outputting the vibration feedback based on the vibration driving signals, includes:

filling short-length signals having the vibration signal amplitude envelopes frame-by-frame into time intervals of the original audio data to obtain the vibration driving signals corresponding to the original audio data, and reserving a last instantaneous power feature and a last threshold of each frame as initial values for a next frame; and outputting the vibration driving signals to the vibrator to generate the vibration feedback.

In some embodiments, acquiring the original audio data, includes: dividing the original audio data at a preset temporal interval, where each preset temporal interval corresponds to one frame of the original audio data.

In some embodiments, acquiring the original audio data, further includes: determining whether a first frame of the original audio data is single-channel data;

in response to the first frame of the original audio data being single-channel data, directly acquiring each subsequent frame of data; and in response to the first frame of the original audio data being not single-channel data, acquiring average values of data from different channels in each subsequent frame of the original audio data.

The computer device 300 provided by the embodiments of the present disclosure can implement the operations of the method for dynamically adjusting vibration feedback with audio as illustrated above, and can achieve the same technical effect. Reference is made to the illustration in the above embodiments and will not be repeated here.

Some embodiments of the present disclosure provide a non-transitory computer readable storage medium, configured to store computer programs, which, when executed by a processor, causes the process to implement operations of the method for dynamically adjusting vibration feedback with audio as illustrated above, and the same technical effect can be achieved, thus will not be repeated here to avoid repetition.

The above mentioned are only the embodiments of the present disclosure. It should be pointed out that for those skilled in the art, improvements can be made without departing from the inventive concept of the present disclosure, but these are all within the scope of protection of the present disclosure.

What is claimed is:

1. A method for dynamically adjusting vibration feedback with audio, comprising:

acquiring original audio data;

defining preset signal vibration thresholds, tracking instantaneous audio power envelopes of the original audio data to obtain corresponding instantaneous power features, and adaptively adjusting the preset signal vibration thresholds according to the instantaneous power features to obtain signal vibration thresholds;

determining the vibration intervals for the original audio data according to the instantaneous power features and the signal vibration thresholds, and dynamically adjusting vibration signal amplitude envelopes of the original audio data to generate vibration driving signals; and outputting vibration feedback based on the vibration driving signals;

wherein defining the preset signal vibration thresholds, tracking the instantaneous audio power envelopes of the original audio data to obtain the corresponding instantaneous power features, and adaptively adjusting the preset signal vibration thresholds according to the instantaneous power features to obtain the signal vibration thresholds, comprises:

in an i-th frame, a preset signal vibration threshold is $T_i$ (1), at a t-th moment in the original audio data, a signal vibration threshold is $T_i(t)$, and an instantaneous power feature obtained by tracking the instantaneous audio power envelopes is $C_i(t)$;

setting a ratio r and adjusting the instantaneous power feature $C_i(t)$ according to the ratio to obtain a second instantaneous power feature $C_i'(t)$, wherein $C_i'(t)=r*C_i(t)$;

comparing an amplitude of the second instantaneous power feature $C_i'(t)$ with a signal vibration threshold $T_i(t-1)$ at a $(t-1)$-th moment, and adaptively adjusting the $T_i(t)$;

in response to the amplitude of $C_i'(t)$ being greater than the $T_i(t-1)$, increasing the signal vibration threshold $T_i(t)$; and in response to the amplitude of $C_i'(t)$ being less than the $T_i(t-1)$, decreasing the signal vibration threshold $T_i(t)$;

wherein determining the vibration intervals for the original audio data according to the instantaneous power features and the signal vibration thresholds, and dynamically adjusting the vibration signal amplitude envelopes of the original audio data to generate the vibration driving signals, comprises:

comparing the $C_i'(t)$ and the $T_i(t)$ in the original audio data, and in response to the $C_i'(t)$ being greater than the $T_i(t)$, determining a time interval corresponding to the t-th moment as a vibration interval; and providing a vibrator having a resonance frequency f and a rated voltage vrms, filling a single-frequency and short-length signal of the resonance frequency f and the rated voltage vrms into the vibration interval according to a length of the vibration interval and a power level within the vibration interval, and adjusting a vibration signal amplitude envelope according to an instantaneous audio power envelope to generate a vibration driving signal within the vibration interval.

2. The method according to claim 1, wherein the ratio r ranges from 0 to 1.

3. The method according to claim 1, wherein outputting the vibration feedback based on the vibration driving signals, comprises:

filling short-length signals having the vibration signal amplitude envelopes frame-by-frame into time intervals of the original audio data to obtain the vibration driving signals corresponding to the original audio data, and reserving a last instantaneous power feature and a last threshold of each frame as initial values for a next frame; and outputting the vibration driving signals to the vibrator to generate the vibration feedback.

4. The method according to claim 1, wherein acquiring the original audio data, comprises:

dividing the original audio data at a preset temporal interval, wherein each preset temporal interval corresponds to one frame of the original audio data.

5. The method according to claim 4, wherein acquiring the original audio data, further comprises:

determining whether a first frame of the original audio data is single-channel data;

in response to the first frame of the original audio data being single-channel data, directly acquiring each subsequent frame of data; and in response to the first frame of the original audio data being not single-channel data, acquiring average values of data from different channels in each subsequent frame of the original audio data.

6. A computer device, comprising:
a memory;
a processor; and
computer programs stored in the memory and executable to the processor;

wherein the computer programs, when executed by the processor, cause the processor to implement operations of a method for dynamically adjusting vibration feedback with audio, wherein the method comprises:

acquiring original audio data;

defining preset signal vibration thresholds, tracking instantaneous audio power envelopes of the original audio data to obtain corresponding instantaneous power features, and adaptively adjusting the preset signal vibration thresholds according to the instantaneous power features to obtain signal vibration thresholds;

determining the vibration intervals for the original audio data according to the instantaneous power features and the signal vibration thresholds, and dynamically adjusting vibration signal amplitude envelopes of the original audio data to generate vibration driving signals; and outputting vibration feedback based on the vibration driving signals;

wherein defining the preset signal vibration thresholds, tracking the instantaneous audio power envelopes of the original audio data to obtain the corresponding instantaneous power features, and adaptively adjusting the preset signal vibration thresholds according to the instantaneous power features to obtain the signal vibration thresholds, comprises:

in an i-th frame, a preset signal vibration threshold is $T_i(1)$, at a t-th moment in the original audio data, a signal vibration threshold is $T_i(t)$, and an instantaneous power feature obtained by tracking the instantaneous audio power envelopes is $C_i(t)$;

setting a ratio r and adjusting the instantaneous power feature $C_i(t)$ according to the ratio to obtain a second instantaneous power feature $C_i'(t)$, wherein $C_i(t)=r*C_i(t)$;

comparing an amplitude of the second instantaneous power feature $C_i'(t)$ with a signal vibration threshold $T_i(t-1)$ at a $(t-1)$-th moment, and adaptively adjusting the $T_i(t)$;

in response to the amplitude of $C_i'(t)$ being greater than the $T_i(t-1)$, increasing the signal vibration threshold $T_i(t)$; and in response to the amplitude of $C_i'(t)$ being less than the $T_i(t-1)$, decreasing the signal vibration threshold $T_i(t)$;

wherein determining the vibration intervals for the original audio data according to the instantaneous power features and the signal vibration thresholds, and dynamically adjusting the vibration signal amplitude envelopes of the original audio data to generate the vibration driving signals, comprises:

comparing the $C_i'(t)$ and the $T_i(t)$ in the original audio data, and in response to the $C_i'(t)$ being greater than the $T_i(t)$, determining a time interval corresponding to the t-th moment as a vibration interval; and providing a vibrator having a resonance frequency f and a rated voltage vrms, filling a single-frequency and short-length signal of the resonance frequency f and the rated voltage vrms into the vibration interval according to a length of the vibration interval and a power level within the vibration interval, and adjusting a vibration signal amplitude envelope according to an instantaneous audio power envelope to generate a vibration driving signal within the vibration interval.

7. A non-transitory computer readable storage medium, configured to store computer programs, which, when executed by a processor, causes the process to implement operations of a method for dynamically adjusting vibration feedback with audio, wherein the method comprises:

acquiring original audio data;

defining preset signal vibration thresholds, tracking instantaneous audio power envelopes of the original audio data to obtain corresponding instantaneous power features, and adaptively adjusting the preset signal vibration thresholds according to the instantaneous power features to obtain signal vibration thresholds;

determining the vibration intervals for the original audio data according to the instantaneous power features and the signal vibration thresholds, and dynamically adjusting vibration signal amplitude envelopes of the original audio data to generate vibration driving signals; and outputting vibration feedback based on the vibration driving signal;

wherein defining the preset signal vibration thresholds, tracking the instantaneous audio power envelopes of the original audio data to obtain the corresponding instantaneous power features, and adaptively adjusting the preset signal vibration thresholds according to the instantaneous power features to obtain the signal vibration thresholds, comprises:

in an i-th frame, a preset signal vibration threshold is $T_i(1)$, at a t-th moment in the original audio data, a signal vibration threshold is $T_i(t)$, and an instantaneous power feature obtained by tracking the instantaneous audio power envelopes is $C_i(t)$;

setting a ratio r and adjusting the instantaneous power feature $C_i(t)$ according to the ratio to obtain a second instantaneous power feature $C_i'(t)$, wherein $C_i'(t)=r*C_i(t)$;

comparing an amplitude of the second instantaneous power feature $C_i'(t)$ with a signal vibration threshold $T_i(t-1)$ at a (t−1)-th moment, and adaptively adjusting the $T_i(t)$;

in response to the amplitude of $C_i'(t)$ being greater than the $T_i(t-1)$, increasing the signal vibration threshold $T_i(t)$; and in response to the amplitude of $C_i'(t)$ being less than the $T_i(t-1)$, decreasing the signal vibration threshold $T_i(t)$;

wherein determining the vibration intervals for the original audio data according to the instantaneous power features and the signal vibration thresholds, and dynamically adjusting the vibration signal amplitude envelopes of the original audio data to generate the vibration driving signals, comprises:

comparing the $C_i'(t)$ and the $T_i(t)$ in the original audio data, and in response to the $C_i'(t)$ being greater than the $T_i(t)$, determining a time interval corresponding to the t-th moment as a vibration interval; and providing a vibrator having a resonance frequency f and a rated voltage vrms, filling a single-frequency and short-length signal of the resonance frequency f and the rated voltage vrms into the vibration interval according to a length of the vibration interval and a power level within the vibration interval, and adjusting a vibration signal amplitude envelope according to an instantaneous audio power envelope to generate a vibration driving signal within the vibration interval.

* * * * *